2,873,170
ANION EXCHANGE METHOD FOR SEPARATION OF METAL VALUES

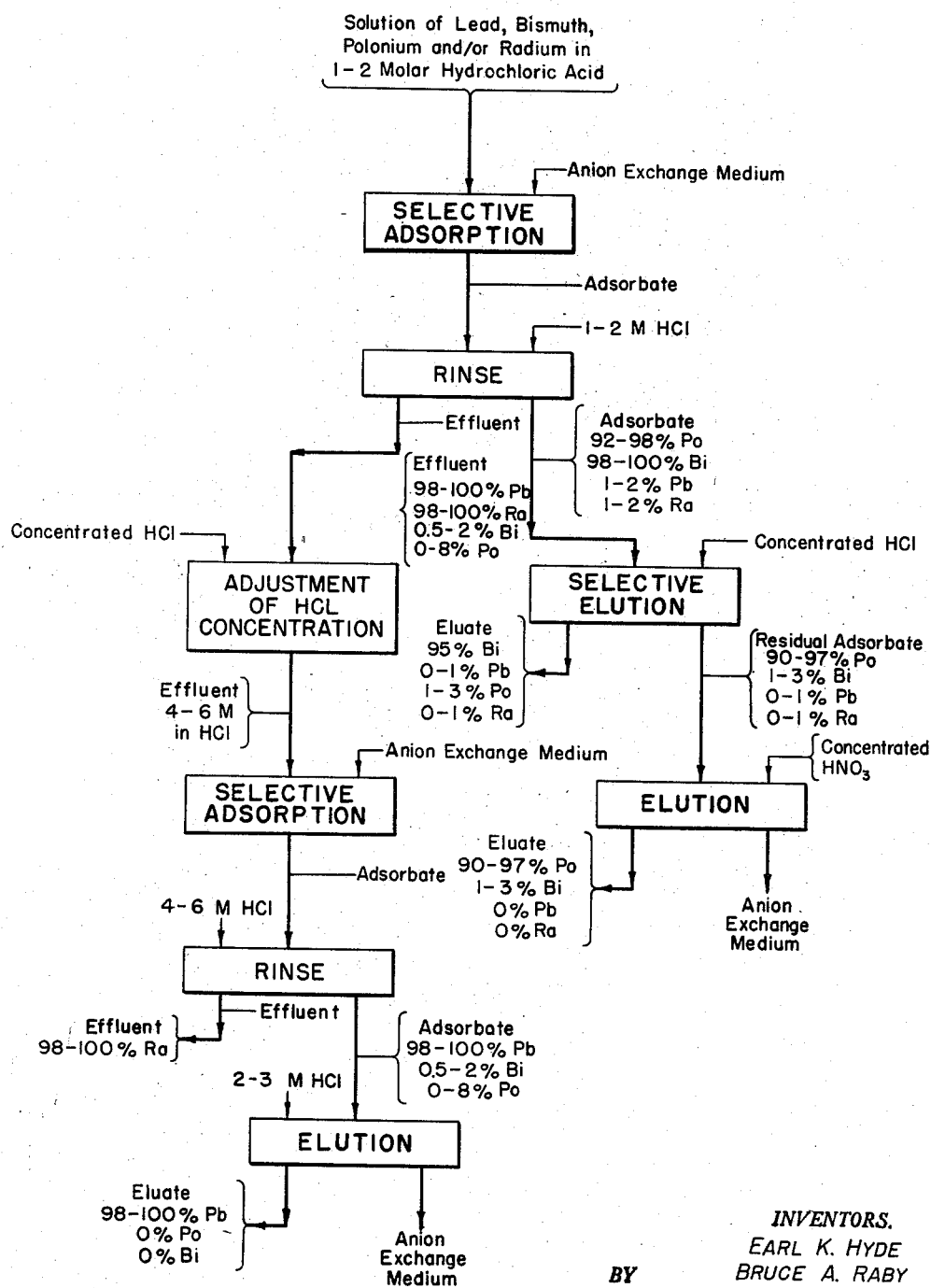

Earl K. Hyde, Berkeley, Calif., and Bruce A. Raby, Dayton, Ohio, assignors to the United States of America as represented by the United States Atomic Energy Commission Application June 17, 1954, Serial No. 437,597

16 Claims. (Cl. 23—19)

This invention relates, in general, to a method of separating the individual elements bismuth, polonium, and lead from a mixture thereof with other material and, more particularly, to such a method of separation wherein these elements are separated by differential elution of their poly-chloro complexes from certain anion exchange media.

Previous methods of separation of the subject metals from mixtures thereof with other materials have depended largely on such processes as precipitation with various precipitating agents under specific conditions of temperature, reagent concentrations, and pH. These processes tend to be unwieldy and relatively inefficient. In the case of the separation of polonium from admixture with other materials, it has been necessary to employ electrodeposition or carrier coprecipitation. Electrodeposition requires critical conditions of operation and is at the same time inefficient and expensive, affording relatively poor yields with long periods of processing. The method of carrier coprecipitation is objectionable because a new and contaminating factor, the carrier, is introduced into the system, requiring an additional subsequent stage of separation.

Now, it has been discovered that certain metallic elements, namely lead, bismuth, and polonium, form poly-chloro ionized complexes with various concentrations of hydrochloric acid, which complexes may be readily and efficiently separated from each other and from other factors by adsorption of the complexes on and elution thereof from certain anion exchange media under various conditions of acid concentration. Such a method of separation has the advantages of rapidity and simplicity of operation, practically quantitative recovery of each of the separated values, and large separation factors. By this method, small amounts of impurities may be separated from relatively large amounts of the desired element or small amounts of the subject metals may be separated from large amounts of impurities. In addition, since the subject separation is based substantially on poly-chloro complexes, only the chloride ion is involved as an additive to the initial system, thus minimizing the contaminating factors introduced to the final products.

Accordingly, it is a principal object of the present invention to provide a simple, practical, and efficient method of separation of certain elements of mass number greater than 200.

Another object of the invention is to provide an improved method for the separation of the individual elements lead, bismuth, and polonium from a mixture thereof.

Still another object of this invention is the separation of the individual elements, lead, bismuth, and polonium from a mixture thereof with radium or other metals by adsorption on and elution from anion exchange media.

Yet another object is to provide a means for the separation of lead, bismuth, and/or polonium from a mixture thereof with impurities.

A further object of this invention is to provide a means for the separation of the subject elements with a minimum of contaminating additive.

A still further object of the invention is to utilize the formation of separable poly-chloro complexes of these metals and their differential adsorption and elution characteristics on anion exchange media to provide a means of separation of the individual metals from mixtures thereof.

Other objects and advantages will become readily apparent from a consideration of the following description together with reference to the attached drawing which shows a flow diagram with typical chemical concentrations and stages of the separation process.

In accordance with the invention as illustrated in the flow diagram of the drawing, a material containing any or all of the elements of the group comprising lead, bismuth and polonium with other factors, such as radium, is treated to yield an acidic aqueous solution wherein hydrochloric acid is present in a critical concentration of 1 to 2 molar. Within such critical range of hydrochloric acid concentration adsorbale poly-chloro complex anions are formed with the bismuth and polonium but not with the lead or other factors which may be present. Such acidic chloride solution is contacted with an anion exchange medium to selectively adsorb the bismuth and polonium polychloro anions therefrom whereby the major portions of the lead, radium and other factors remain in the effluent residual solution. Usually, the foregoing operation is performed in a column, the column is rinsed with an additional volume of 1–2 M hydrochloric acid to remove residual small quantities of lead, radium and other impurities therefrom. Substantially only the bismuth and polonium then remain as an adsorbate on the resin in the column.

As a precaution it is to be noted that in the presence of lead, the HCl concentration in the foregoing solutions is critical since as the hydrochloric acid concentration is increased to above about 3 molar, lead will also form an adsorbale poly-chloro complex. Moreover, at HCl concentrations of above about 7.5 molar the adsorption of the bismuth poly-chloro complexes is unduly suppressed.

The adsorbate of polonium and bismuth in the column is contacted with concentrated hydrochloric acid (i. e., above about 8.0 molar) to selectively elute the bismuth away from the polonium in the adsorbate yielding an eluate comprising a strongly acidic chloride solution from which the bismuth can be recovered by conventional means. Thenceforth, the polonium is eluted by contacting the residual adsorbate with concentrated nitric acid yielding an acidic nitrate solution of the polonium values as the eluate from which the polonium values may be recovered by conventional means. It will be apparent hereinafter that extremely stable poly-chloro complexes of the polonium exist in all concentrations of hydrochloric acid employed in this process, which complexes are strongly retained by the anion exchange media. Therefore, hydrochloric acid cannot be employed to elute polonium; however, concentrated nitric acid was found to effectively elute the polonium, since this reagent appears to destroy the poly-chloro complexes, thereby effecting elution of the polonium values.

The effluent, from the first selective adsorption and which contains the lead, radium and other values of the original material as a solution which is 1 to 2 molar in hydrochloric acid is treated with concentrated hydrochloric acid to adjust the acid concentration to within the range of 4 to 7.5 molar in hydrochloric acid. Within this concentration range, adsorbable lead poly-chloro complex anions are formed therein. However, if the acid concentration is above or below such range, anionic exchange adsorption of lead will not occur. Subsequent to acidification, the effluent thereof is contacted with a second column of a similar anion exchange medium to selectively adsorb the lead poly-chloro anions therefrom leaving other values including radium in the effluent. To insure thorough removal of residual solution and undesired values from the anion exchange medium, the adsorbate in the column is rinsed with a quantity of 4 to 6 molar hydrochloric acid. Values such as radium may then be recovered from the effluent which corresponds to an acidic chloride solution, of such values, by means well known in the art.

The lead values present in the adsorbate of the second column are then eluted by contact with 2 to 3 molar hydrochloric acid yielding an acidic chloride eluate solution of the lead values from which the lead values are recovered by conventional means.

Typical anion exchange media which are applicable in the present separation process include Dowex A-1 and Dowex 2 which are strong base quaternary ammonia type anion exchange resins as described in the May 1951 issue of "Industrial and Engineering Chemistry," volume 43, pages 1088 and 1089. Chemical and physical properties of similar suitable strong base anion exchange materials are further described in Nachod, F. C., "Ion Exchange," published by Academic Press, Inc., New York, N. Y., in 1949, and Samuelson, Olaf, "Ion Exchangers in Analytical Chemistry," published by Wiley and Sons, Inc., New York, N. Y., in 1953. These materials are employed in a salt form having anions freely exchangeable with other anions in an aqueous solution in accordance with conventional concepts. While the above materials have been cited as examples, it is to be understood that the specific anion exchange medium should not be unduly limited thereby since other anionic exchange materials which possess the necessary inertness to the strong reagents employed herein may be expected to behave similarly with reference to the anionic exchange of materials treated herein. Generally speaking the strongly basic anionic exchange resins produce the best results.

Other details of the process of the invention including a more comprehensive elucidation of the critical nature of hydrochloric acid concentration in the adsorption and elution of these elements will be apparent by consideration of the following experimental examples:

EXAMPLE I

In order to ascertain the adsorption and elution characteristics of the poly-chloro complexes of bismuth on a typical anion exchange medium, a solution of 5 microliters of tracer containing lead 211, bismuth 215, and polonium 210 in 1 milliliter of hydrochloric acid solution was placed on a column which was 7 mm. long by 2 mm. in diameter and packed with coarse grains of Dowex A-1 anion exchange resin. The solution flowed, with the aid of suction, through the column at the rate of about 1 ml. per minute. Elution of the adsorbed poly-chloro complexes was accomplished by passing through the column 2 milliliters of the elution agent as indicated in Table 1 infra. Adsorption and elution values as estimated from $\beta$ and $\alpha$ activity are as follows:

Table 1
ANION EXCHANGE BEHAVIOR OF BISMUTH

| HCl concentration of Tracer Solution | Percent Bismuth Adsorbed | Elution Reagents | Percent Bismuth Eluted by 2 ml. of Reagent |
| --- | --- | --- | --- |
| 0.1 M HCl | 99 | H₂O | 0 |
| 3.0 M HCl | 96–99 | 0.1 N HCl | 0 |
| 6.0 M HCl | 95–99 | 4.0 N HClO₄ | 0 |
| 8.0 M HCl | 33 | Conc. HCl | 63 |
| 10.0 M HCl | 19 | Saturated HCl | 72–93 |
| | | Concentrated HNO₃ | 94–99 |

The observed $\beta$ count in 5 microliters of tracer solution was $1.54 \times 10^5$ counts per minute; the alpha counting rate was $8.0 \times 10^4$ counts per minute. From the values of Table I, it is apparent that adsorption of bismuth is complete from 0.1 molar to 6 molar hydrochloric acid concentration and that saturated hydrochloric acid, that is, concentrated hydrochloric acid solution saturated with hydrochloric acid gas at a temperature of 0° C., and concentrated nitric acid are good eluting agents.

EXAMPLE II

The adsorption and elution of poly-chloro complexes of lead from hydrochloric acid solutions within certain concentration ranges was studied for Dowex A-1 anion exchange resin using lead²¹¹ having a half life of thirty-six minutes as a tracer. In this experiment aliquots of the lead tracer solution were diluted to form .5 ml. quantities of various compositions as shown in column 1 of Table 2 below. Column 2 shows the percentage of the lead passing through a column of Dowex A-1 resin at a flow rate of about 1 ml. per minute as determined by alpha counting of bismuth²¹¹ which came to equilibrium with lead²¹¹ within a few minutes. The anion exchange resin was contacted with first 1 milliliter, then 2 milliliters of hydrochloric acid, with elution as indicated in columns 3 and 4 of the table.

Table 2
ANION EXCHANGE BEHAVIOR OF Pb TRACER

| Concentration of HCl Solutions | Percent Pb not adsorbed from Initial Solution | Percent Pb Eluted by 1st Wash | Percent Pb Eluted by 2d Wash |
| --- | --- | --- | --- |
| 3.0 | 3.0 | 89.0 | 11 |
| 4.0 | 0.4 | 0.6 | 0 |
| 4.5 | 0.4 | 0.6 | 0 |
| 5.0 | 0.5 | 0.9 | 0 |
| 5.5 | 0.6 | 0.03 | 0 |
| 6.0 | 0.8 | 0.5 | 0 |
| 6.5 | 0.9 | 0.6 | 0 |
| 7.0 | 0.6 | 0.3 | 0 |
| 7.5 | 0.6 | 0.02 | 0 |
| 8.5 | 65.0 | 23.0 | 0 |

The data of Table 2 clearly shows that lead is strongly adsorbed and held by Dowex A-1 resin from hydrochloric acid solutions in the concentration range between 4 molar and 7.5 molar, but can be completely washed from the resin with hydrochloric acid values above and below this range. Comparison of these values with those of Table I indicates that a clean separation of the lead and bismuth tracers is effected readily by passing a 1–2 molar hydrochloric acid solution of these factors through a column of suitable anion exchange resin.

EXAMPLE III

A quantity of a 2 molar hydrochloric acid solution of lead, bismuth, and polonium was placed on a 7 mm. long by 2 mm. diameter column of an anion exchange resin and the resin was rinsed with 3 milliliters of hydrochloric acid and three 1 milliliter aliquots of nitric acid. The results of an assay of the eluted solutions for polonium alpha activity and bismuth beta activity are as follows:

Table 3
PERCENT TRACER IN SOLUTIONS PASSED THROUGH DOWEX A-1 COLUMN

| | Initial 1 ml. 2 M HCl | 3 ml. Conc. HCl Rinse | 1st 1 ml. Conc. HNO₃ | 2nd 1 ml. Conc. HNO₃ | 3rd 1 ml. Conc. HNO₃ | Total Recovery |
| --- | --- | --- | --- | --- | --- | --- |
| Polonium | 5.0 | 1.3 | 32.0 | 41.0 | 1.4 | 81±5 |
| Bismuth | 0.5 | 92.6 | 3.3 | 0.1 | 0.1 | 97±5 |

As shown in Table 3 above, approximately 20% of the polonium was not recovered as such; this amount is ascribed to hydrolyzed and/or polymerized species which were not readily eluted from the resin. In succeeding experiments, this difficulty was avoided by passing the original mixture of lead, polonium, and bismuth adjusted to 2 molar in hydrochloric acid through the resin column, contacting the resin with 2 milliliters of concentrated hydrochloric acid, eluting the unhydrolyzed polonium from the resin with nitric acid, evaporating this solution to dryness, and dissolving the residue in concentrated hydrochloric acid. The unhydrolyzed polonium solution in hydrochloric acid thus obtained was contacted, as before, to a new column of Dowex A-1 resin which was subsequently rinsed with 2 milliliters of concentrated hydrochloric acid and three 1 milliliter portions of concentrated nitric acid. The results are shown in Table 4 below:

Table 4

PERCENT POLONIUM TRACER IN SOLUTION PASSED THROUGH DOWEX A-1 COLUMN

| Initial 1 ml. 2 M HCl | 3 ml. Conc. HCl Rinse | 1st 1 ml. Conc. HNO$_3$ | 2nd 1 ml. Conc. HNO$_3$ | 3rd 1 ml. Conc. HNO$_3$ | Total Recovery |
|---|---|---|---|---|---|
| 7.8 | 2.8 | 18.6 | 66.6 | 4.6 | 100±5 |

From the separate and combined results of the individual described experiments I to III as expressed in Tables 1 to 4, it is evident that an efficient separation of each of these individual components from a mixture thereof is possible through use of the subject process.

While there has been described herein the salient features of the instant process as applied to one embodiment thereof, it will, of course be apparent that numerous modifications may be made within the spirit and scope of the invention, and it is not, therefore, desired to limit the invention to the exact details described except insofar as they may be defined in the following claims.

What is claimed is:

1. In a method for separating radium, bismuth, polonium and lead values from a mixture thereof, the steps comprising producing a solution of said mixture having therein hydrochloric acid with a concentration in the range of 1 to 2 molar, thereby forming anionic poly-chloro complexes with the polonium and bismuth, contacting said solution with a first anion exchange resin to selectively adsorb the polonium and bismuth leaving at least the radium and lead in the effluent, adding hydrochloric acid to said effluent to increase the hydrochloric acid concentration therein to within the range of 4 to 6 molar, then contacting said effluent with a second anion exchange resin to selectively adsorb the lead thereon leaving the radium in the effluent, recovering the radium from said effluent, contacting the adsorbate of said second exchange resin with 2 to 3 molar hydrochloric acid solution thereby eluting the lead values, contacting the adsorbate of said first anion exchange resin with hydrochloric acid of above about 8.0 molar concentration to elute the bismuth values therefrom, and finally contacting the residual adsorbate of said first resin with concentrated nitric acid to elute the polonium values therefrom.

2. In an anionic exchange method for separating radium, bismuth, polonium and lead values existing as an impure admixture, the steps comprising producing an acidic chloride solution of at least said values having a chloride ion content equivalent to hydrochloric acid of 1 to 2 molar concentration, whereby adsorbable polychloro anions of the polonium and bismuth are formed therein, and selectively adsorbing the polonium and bismuth values from such solution by contact with an anion exchange resin, whereby the lead and radium values remain in the solution.

3. In an anionic exchange method for separating and recovering bismuth values wherein there is produced an adsorbate of poly-chloro bismuth anions on an anion exchange resin, the step comprising eluting the bismuth values from said resin adsorbate with an elutriant selected from the group consisting of hydrochloric acid of above about 8.0 molar concentration and concentrated nitric acid.

4. The process as defined in claim 3 wherein said elutriant comprises an aqueous solution having a hydrochloric acid content corresponding to at least concentrated HCl.

5. In an anionic exchange method for separating and recovering polonium values wherein there is produced an adsorbate of poly-chloro polonium anions on an anion exchange resin, the step comprising eluting the polonium values from said resin adsorbate with concentrated nitric acid.

6. In an anionic exchange method for separating radium values from impurities including polonium, bismuth and lead, the steps comprising producing a solution of said materials in hydrochloric acid having a concentration in the range of 4.0 to about 7.5 molar, thereby producing adsorbable polychloro anions of said impurities, and selectively adsorbing said impurity anions on an anionic exchange resin away from the radium in the solution.

7. In an anionic exchange method for separating radium values from impurities including polonium and bismuth, the steps comprising producing a solution of said materials in hydrochloric acid of 1.0 to about 7.5 molar, thereby producing adsorbable poly-chloro anions of said impurities, and selectively adsorbing said impurity anions on an anionic exchange resin away from the radium in the solution.

8. In an anionic exchange process wherein there is produced an adsorbate of poly-chloro lead anions on an anion exchange resin, the step comprising eluting the lead from said adsorbate by contact with hydrochloric acid having a concentration in the range of 1 to 3 and above about 7.5 molar.

9. In a method for the separation and recovery of bismuth, polonium, and lead values from admixture with impurities, the steps comprising producing an acidic chloride solution of at least said values wherein the chloride ion concentration is in the range of 4 to about 7.5 molar, thereby forming anionic poly-chloro complexes with the lead, bismuth, and polonium, contacting said solution with an anion exchange resin to adsorb said values thereon, contacting the adsorbate obtained thereby with 2 to 3 molar hydrochloric acid to selectively elute the lead values therefrom, then contacting the adsorbate with hydrochloric acid of above about 8.0 molar concentration to selectively elute the bismuth values, and finally contacting the adsorbate with concentrated nitric acid to elute the polonium values therefrom.

10. In a method for recovering bismuth values from a material containing the same together with impurities, the steps comprising producing an acidic chloride solution of said material including the bismuth values and wherein the chloride ion concentration is within the range of 0.1 to about 8.0 molar, thereby forming polychloro complex anions with the bismuth, contacting the solution with an anion exchange resin to adsorb the bismuth values thereon, and then contacting the adsorbate obtained thereby with an agent selected from the group consisting of HCl of above about 8.0 molar and concentrated HNO$_3$, to elute the bismuth values therefrom.

11. In a method for recovering polonium values from a material containing the same together with impurities, the steps comprising producing an acidic chloride solution of said material including the polonium values and having a chloride ion concentration greater than 0.1 molar, thereby forming poly-chloro complex anions with the polonium, contacting said solution with an anion exchange resin to adsorb the polonium anions thereon, and then contacting the adsorbate obtained thereby with concentrated nitric acid to elute the polonium therefrom.

12. The method as described in claim 11 but wherein said chloride concentration is supplied by hydrochloric acid of above 2.0 molar concentration, whereby more complete adsorption and recovery of the polonium is effected.

13. In a method for separating bismuth and polonium values from a mixture thereof with impurities, the steps comprising producing a solution of said mixture having a hydrochloric acid concentration in the range of 1 to 2 molar, thereby forming adsorbable anionic poly-chloro complexes with the polonium and bismuth, contacting said solution with an anion exchange resin to selectively adsorb said polonium and bismuth values, contacting the adsorbate with concentrated hydrochloric acid to selectively elute the bismuth values, and then contacting the residual adsorbate with concentrated nitric acid to elute the polonium values therefrom.

14. In a process for separating and recovering bismuth, polonium, and lead values from a material including impurities, the steps comprising producing an acidic aqueous chloride solution of at least said values wherein the chloride ion content is in the range of 4 to 7.5 molar, and contacting said solution with an anionic exchange resin to selectively adsorb said values away from impurities remaining in the solution.

15. A method of separating bismuth, polonium, lead, and radium values from a mixture thereof comprising producing a solution of said mixture in 1 to 2 molar hydrochloric acid, thereby forming adsorbable poly-chloro anionic complexes with the polonium and bismuth, contacting said solution with a first column of anion exchange resin to selectively adsorb said complexes leaving the lead and radium in the effluent, adding hydrochloric acid to the effluent solution from the anion exchange resin to increase the concentration thereof to 4 to 6 molar, thereby forming adsorbable poly-chloro anionic complexes with the lead, contacting said acidified solution with a second column of anion exchange resin to selectively adsorb the lead anions away from the radium in the effluent, contacting the adsorbate of the second column with 2 to 3 molar hydrochloric acid to elute the lead values, contacting the adsorbate of the first column of anion exchange resin with hydrochloric acid of above about 7.5 molar concentration to selectively elute the bismuth values therefrom, then contacting the residual adsorbate of the first column of anion exchange resin with concentrated nitric acid to elute the polonium values, evaporating the polonium eluate to dryness, dissolving the polonium residue obtained in the preceding operation in hydrochloric acid, contacting the polonium solution with a third column of anion exchange resin to selectively readsorb the polonium values, rinsing the adsorbate with concentrated hydrochloric acid to remove impurities, contacting the rinsed adsorbate with concentrated nitric acid to elute the purified polonium values, and recovering the polonium values from the purified eluate.

16. In a method for separating radium, bismuth, polonium and lead values from a mixture thereof, the steps comprising producing a solution of said mixture having therein hydrochloric acid with a concentration in the range of 1 to 2 molar, thereby forming anionic polychloro complexes with the polonium and bismuth, contacting said solution with a first anion exchange resin to selectively adsorb the polonium and bismuth values leaving the lead and radium in the effluent, adding hydrochloric acid to the effluent to increase the hydrochloric concentration therein to the range of about 4 to 7.5 to produce adsorbable anionic lead polychloro complexes therein, contacting the acidified effluent with a second anionic exchange resin to selectively adsorb the lead values leaving radium values in the effluent, and recovering radium values from the effluent from the second resin.

References Cited in the file of this patent

UNITED STATES PATENTS 2,723,901    Hageman et al. _____ Nov. 15, 1955

FOREIGN PATENTS 142,890    Australia _____ Aug. 14, 1951

OTHER REFERENCES

Ind. and Eng. Chem., March 1949, page 449.
Metal Recovery by Anion Exchange, pages 618–624, Ind. and Eng. Chemistry, vol. 37, No. 7.
Journ. of Amer. Chem. Soc., vol. 74, No. 5, pages 1278–86.
Ion Exchange Resins, by Kunin and Myers, pages 135, 136, 1950 ed., John Wiley and Sons, Inc., N. Y.